(12) United States Patent
Park et al.

(10) Patent No.: US 6,590,618 B1
(45) Date of Patent: Jul. 8, 2003

(54) METHOD AND APPARATUS FOR CHANGING THE CHANNEL OR VARYING THE VOLUME LEVEL IN A TELEVISION RECEIVER HAVING A DOUBLE SCREEN MODE FUNCTION

(75) Inventors: Hong-Sik Park, Kyonggi-do (KR); Sang-Rok Han, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/395,531

(22) Filed: Sep. 14, 1999

(30) Foreign Application Priority Data

Sep. 14, 1998 (KR) ............................................ 98-37772

(51) Int. Cl.⁷ ............................ H04N 5/44; H04N 5/50; H04N 5/445; H04N 5/45; G08C 19/00
(52) U.S. Cl. ...................... 348/734; 348/731; 348/565; 348/564; 348/563; 348/553; 340/825.69; 340/825.72
(58) Field of Search .................... 348/734, 565, 348/564, 563, 553, 731; 340/825.69, 825.72, 825.25; 345/158; 725/38, 139, 151–2

(56) References Cited

U.S. PATENT DOCUMENTS

| | | | |
|---|---|---|---|
| 5,237,418 A | * 8/1993 | Kaneko | 358/183 |
| 5,594,509 A | * 1/1997 | Florin et al. | 348/731 |
| 5,901,366 A | * 5/1999 | Nakano et al. | 455/575 |
| 5,969,769 A | * 10/1999 | Hamadate | 348/568 |
| 6,040,829 A | * 3/2000 | Croy et al. | 345/327 |
| 6,075,575 A | * 6/2000 | Schein et al. | 348/734 |
| 6,115,080 A | * 9/2000 | Reitmeier | 348/731 |
| 6,239,845 B1 | * 5/2001 | Itagaki et al. | 348/552 |
| 6,243,645 B1 | * 6/2001 | Moteki et al. | 701/211 |
| 6,249,322 B1 | * 6/2001 | Sugihara | 346/634 |
| 6,334,217 B1 | * 12/2001 | Kim | 725/38 |

* cited by examiner

*Primary Examiner*—John Miller
*Assistant Examiner*—Paulos Natnael
(74) *Attorney, Agent, or Firm*—Dilworth & Barrese, LLP

(57) ABSTRACT

Disclosed is a method and apparatus for changing a channel or a varying a volume level of a television receiver having a normal screen mode function and a multiple screen mode function. According to the method, it is first checked whether or not a control signal for the channel or volume level conversions of the main picture or sub-picture is input from a remote controller having plurality of channel changing keys and plurality of volume level changing keys. Thereafter, it is determined whether or not the input control signal is a signal corresponding to either the plurality of channel changing keys or the plurality of volume level changing keys. Afterwards, it is determined whether or not the television is in the multiple screen mode when the input control signal is the signal corresponding to either the plurality of channel changing keys or the plurality of volume level changing keys. Thereafter, when the screen is in the multiple screen mode, either a channel of the main picture or the sub picture is selectively converted and the volume level of the main picture or the sub-picture is varied depending on inputs of the plurality of channel changing keys and the plurality of volume level changing keys. The apparatus comprises a television remote controller capable of changing a channel or a volume level of a television receiver having a screen capable of displaying both a normal mode and a multiple screen mode. The remote controller contains several channel changing and several volume changing keys for changing the channels and the volume on both screens.

13 Claims, 17 Drawing Sheets

METHOD AND APPARATUS FOR CHANGING THE CHANNEL OR VARYING THE VOLUME LEVEL IN A TELEVISION RECEIVER HAVING A DOUBLE SCREEN MODE FUNCTION

BACKGROUND OF THE INVENTION

1. Field of the Invention

The present invention relates to a method and an apparatus for changing the channel or varying the volume of a television receiver. Specifically, the invention relates to a method and apparatus for changing the channel or varying the volume of a sub-picture in a television receiver having a multiple or double screen mode without changing the sub-picture into a new main picture.

2. Description of the Related Art

The continuing development of the broadcasting, communication, and electronic technologies demand widespread access to television receivers, therefore, they are commonplace. Televisions have become the preferred means of disseminating information to the public. The traditional means such as newspapers, magazines and the radio, no longer hold the same position as they once did. With the continual development of the television and movie industries, a wide range of programming is now available to all members of society.

Some televisions are capable of displaying a multiple screen mode. This is a function that displays dual pictures, i.e. a main picture and a sub-picture, on one screen.

The standard television receiver displays only one station at a time. There are times when two or more preferred programs are broadcasted simultaneously. The viewer is forced to choose one program over the other. In order to satisfy the viewers' desire to see both programs, there was provided a television receiver capable of displaying two images on one screen (hereinafter referred to as the multiple screen mode). Such television receivers display dual pictures consisting of a main picture 2 and a sub-picture 4 on one screen 10 as shown in FIG. 1B.

FIG. 1A shows the normal screen mode wherein only the main picture 2 is displayed on the screen. Occasionally, the viewer may wish to view two programs simultaneously in multiple screen mode. To accomplish this, the viewer pushes a multiple screen key 12, on the remote controller shown in FIG. 1B, whereby a main picture and a sub-picture are displayed on the same screen. The viewer may also wish to exchange the positions of the main picture and the sub-picture. To accomplish this, the viewer pushes a main-sub picture changing key 14, whereby the old main picture 2 of FIG. 1B is converted into a new sub-picture 4' of FIG. 1C and the old sub-picture 4 of FIG. 1B is converted into a new main picture 2' of FIG. 1C.

Television receivers having the above-described multiple screen mode function, however, have a significant disadvantage. Whenever the viewer wishes to change the channel or the volume of the sub-picture window, they must first push the button to convert the present sub-picture into a new main picture. In other words, changing the channel and the volume level are possible only in the main picture.

SUMMARY OF THE INVENTION

Accordingly, the present invention is directed to a method and apparatus for changing the channel and/or the volume level of a sub-picture in a television having a multiple screen mode function without the limitations and disadvantages of the related art.

It is therefore an object of the present invention to change the channel or vary the volume of a sub-picture, in the multiple screen mode, without converting the sub-picture into a new main picture.

In order to achieve this object, there is provided a unique remote controller and a method for changing the channel or varying the volume of a sub-picture in a television receiver having the multiple screen mode function. According to the method, it is first checked whether or not a control signal for the channel or volume level changes of the main picture or sub-picture is input from a remote controller having a plurality of channel changing keys and a plurality of volume level changing keys. Thereafter, it is determined whether or not the input control signal is a signal corresponding to either the plurality of channel changing keys or the plurality of volume level changing keys. Also, it is determined whether or not the television is in the multiple screen mode when the input control signal is received. If the screen is in the multiple screen mode, either the channel or the volume level of the main picture or the sub picture is selectively increased or decreased depending on the inputs of the plurality of channel changing keys and the plurality of volume level changing keys. If the screen is not in the multiple screen mode, then either the channel or the volume level of the main picture is selectively increased or decreased depending on the inputs of the plurality of channel changing keys and the plurality of volume level changing keys.

BRIEF DESCRIPTION OF THE DRAWINGS

Other objects and features of the present invention will become apparent from the following detailed description considered in connection with the accompanying drawings that disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE INVENTION

Reference will now be made in detail to the preferred embodiment of the present invention. It should be noted that throughout the detailed description of the invention, the television receivers of the preferred embodiments are capable of displaying a multiple screen mode that concurrently displays two pictures, a main and a sub-picture, on one screen.

Figure 3A:
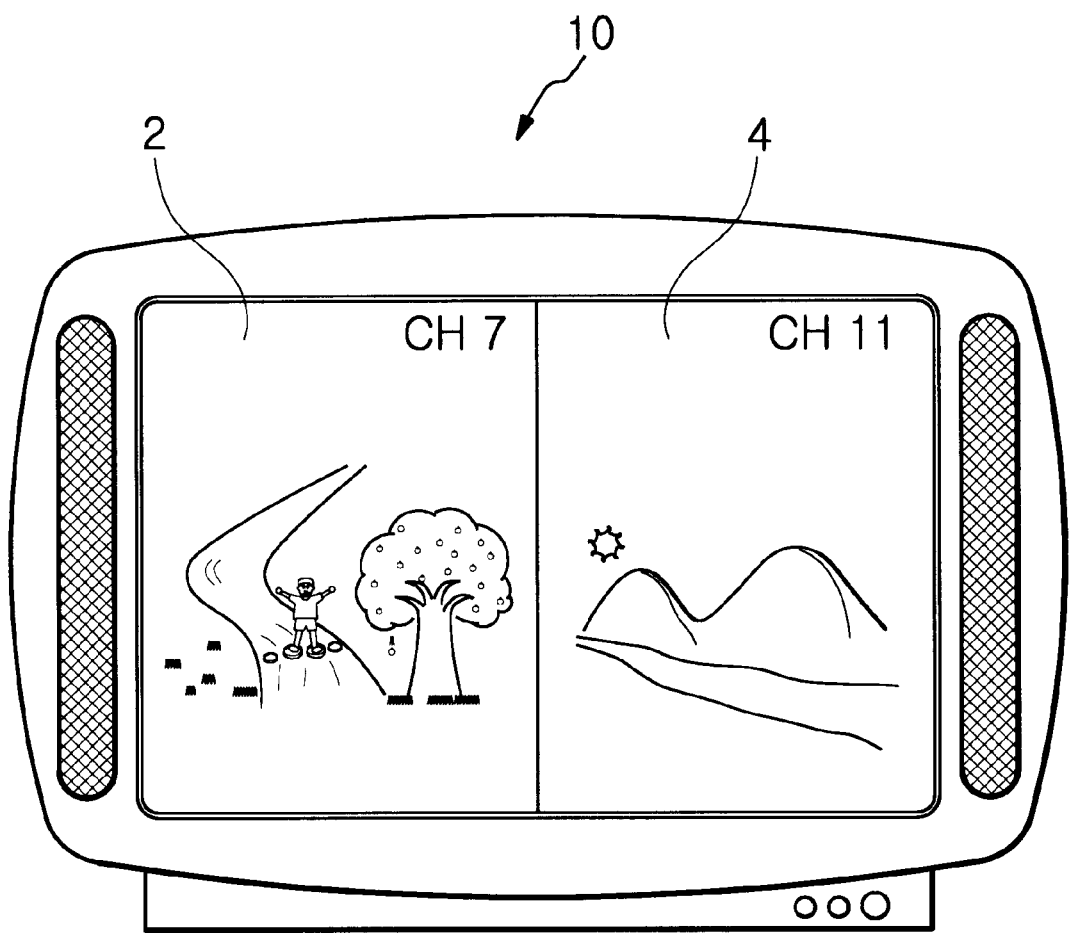
FIGS. 3A to 3C are schematic diagrams showing a method and device for changing a channel of a main-picture in the multiple screen mode of a television in accordance with the present invention.

Referring now to FIGS. 3–4, there are described methods of changing the channel of the main-picture and of controlling the volume of the main-picture. Specifically, FIG. 3A shows a television receiver 10 having a multiple screen mode function (shown) that displays a main picture 2 and a sub-picture 4 on one screen and a normal screen mode function (not shown) which displays only the main picture 2 on one screen.

Figure 3B:
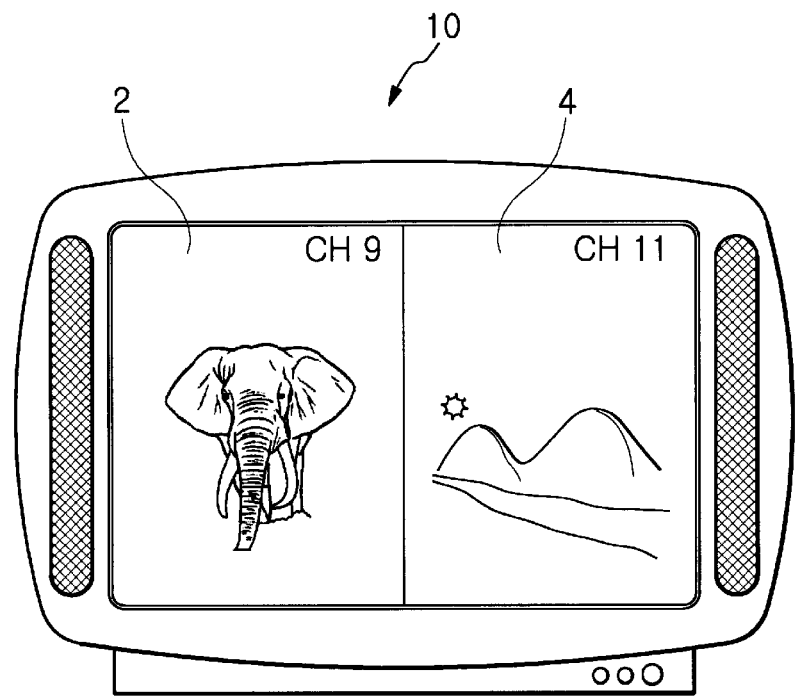
Figure 3B:
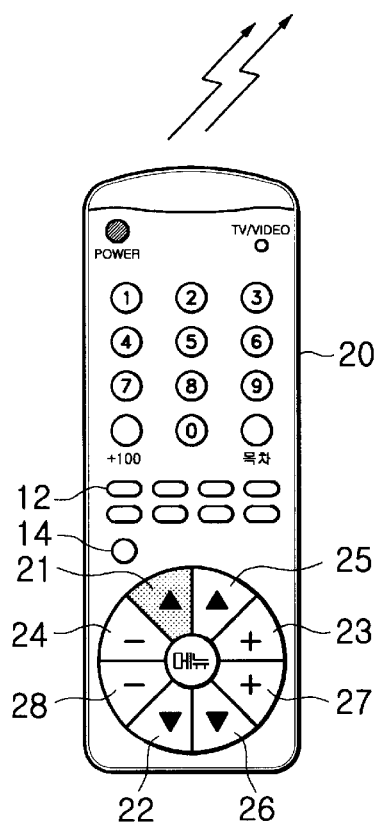
Figure 3C:
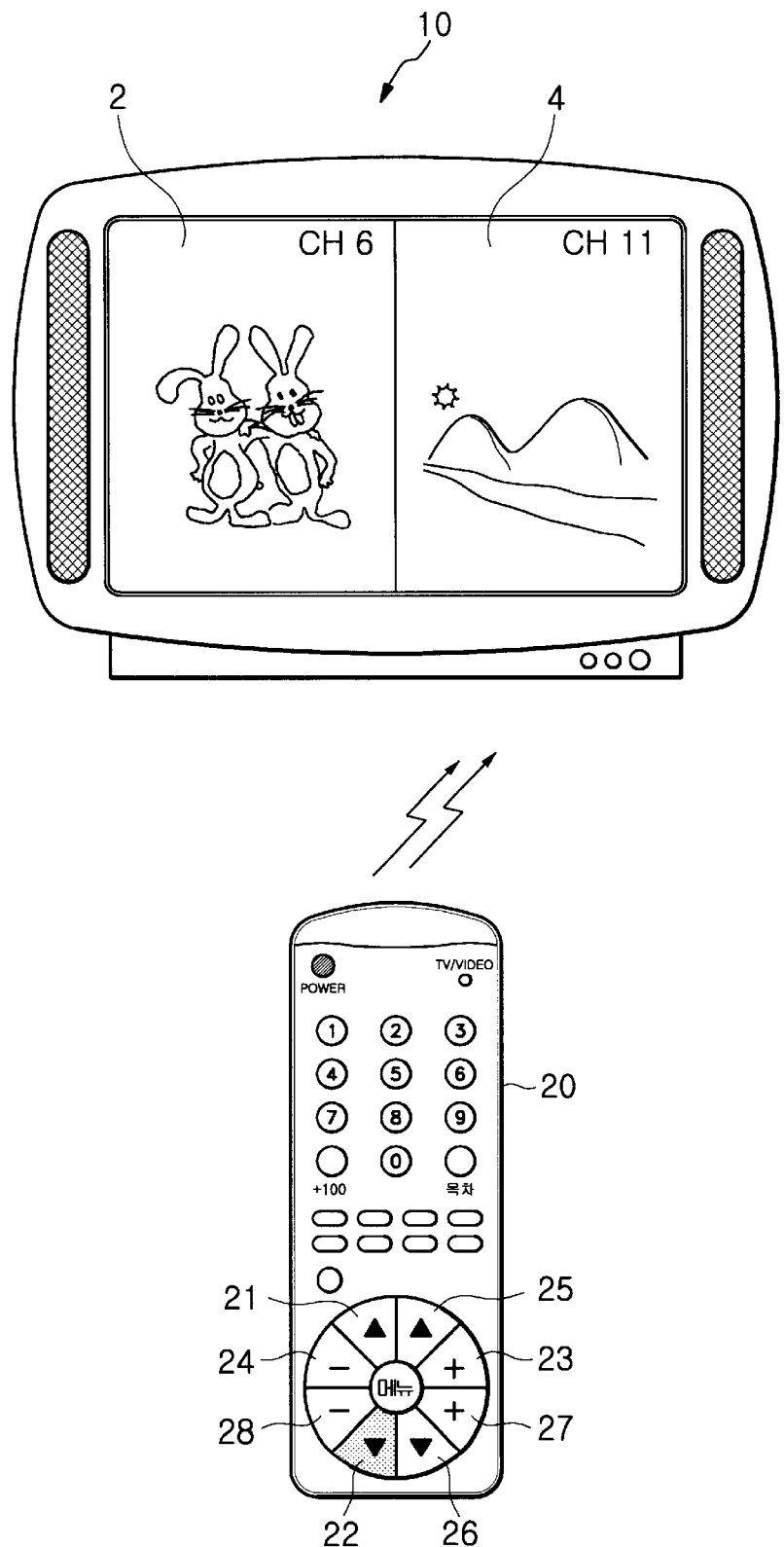

Referring to FIG. 3B, a remote controller 20 is used not only for changing a channel or an operation mode, but also for varying a volume level of television receiver 10. Remote controller 20 includes a plurality of channel changing keys (or buttons) 21, 22, 25 and 26; a plurality of volume varying keys 23, 24, 27, and 28, and a mode changing key or multiple screen button 12.

The channel changing keys include main picture channel changing keys 21 and 22, and sub-picture channel changing keys 25 and 26. The main picture channel changing keys 21 and 22 include main picture channel up key 21 for changing a channel of a main picture to a higher channel, and main picture channel down key 22 for changing a channel of a main picture to a lower channel. The sub-picture channel changing keys 25 and 26 include sub-picture channel up key 25 for changing a channel of a sub-picture to a higher channel, and sub-picture channel down key 26 for changing a channel of a sub-picture to a lower channel.

The volume varying keys 23, 24, 27 and 28 include main picture volume varying keys 23 and 24, and sub-picture volume varying keys 27 and 28. The main picture volume changing keys 23 and 24 include main picture volume up key 23 for varying a volume of a main picture to a higher volume level, and main picture volume down key 24 for changing a channel of a main picture to a lower channel. The sub-picture volume varying keys 27 and 28 include sub-picture volume up key 27 for changing a volume of a sub-picture to a higher volume level, and sub-picture volume down key 28 for changing a volume of a sub-picture to a lower volume level.

FIGS. 3A and 3B describe how to convert a channel of the main picture from channel "7" to channel "9". First, the viewer pushes main picture channel up key 21 on remote controller 20. As main picture channel up key 21 is pushed, an infrared ray having a specific wavelength band is irradiated. Second, television receiver 10 receives the infrared ray signal for changing the present main picture channel of channel "7" into a higher channel, for example, channel "9" through an infrared ray receiver (not shown) and the received channel up infrared signal is transmitted into a microprocessor of television receiver 10. Finally, the microprocessor converts the present channel of main picture 2, channel "7" into channel "9". At this time, sub-picture 4 maintains the present channel of channel "11" as a sub-picture channel changing signal has not been received.

Figure 1A:
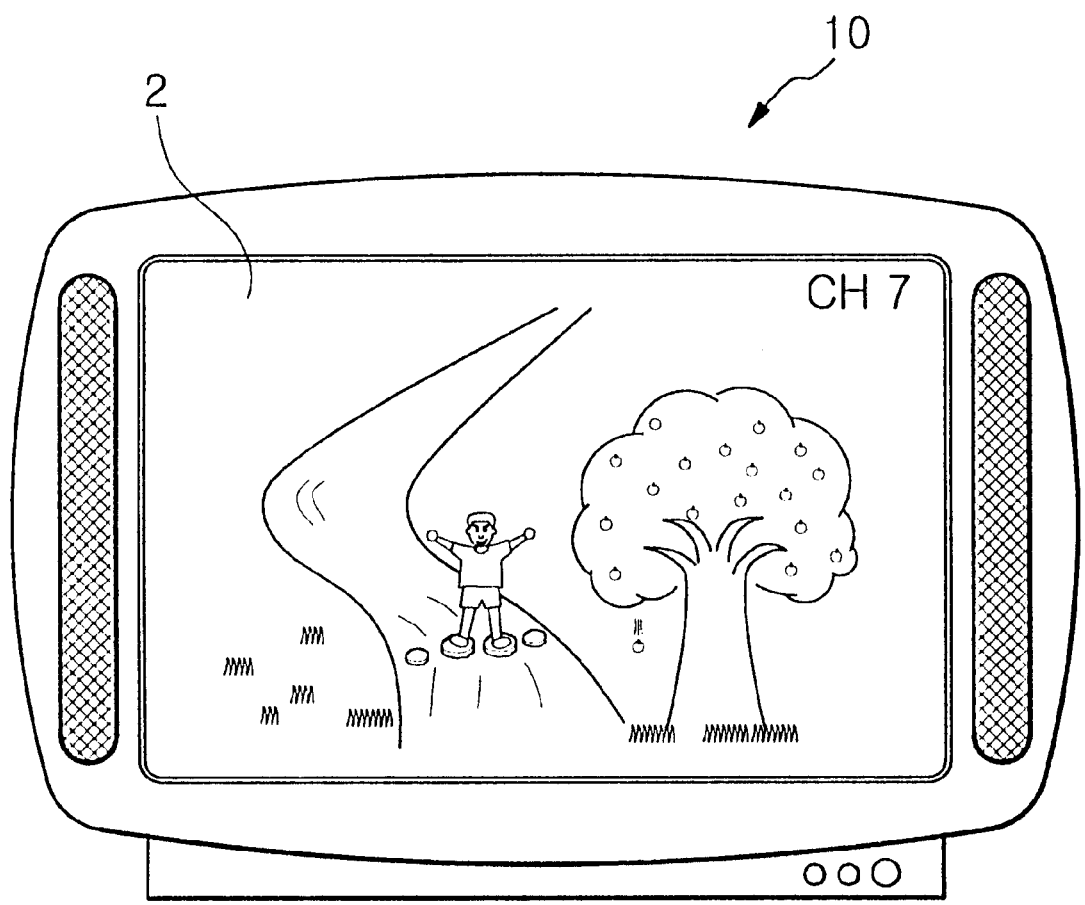
FIGS. 1A to 1C are schematic diagrams describing a channel changing method of a main picture in a conventional television receiver having a multiple screen mode function.
Figure 1B:
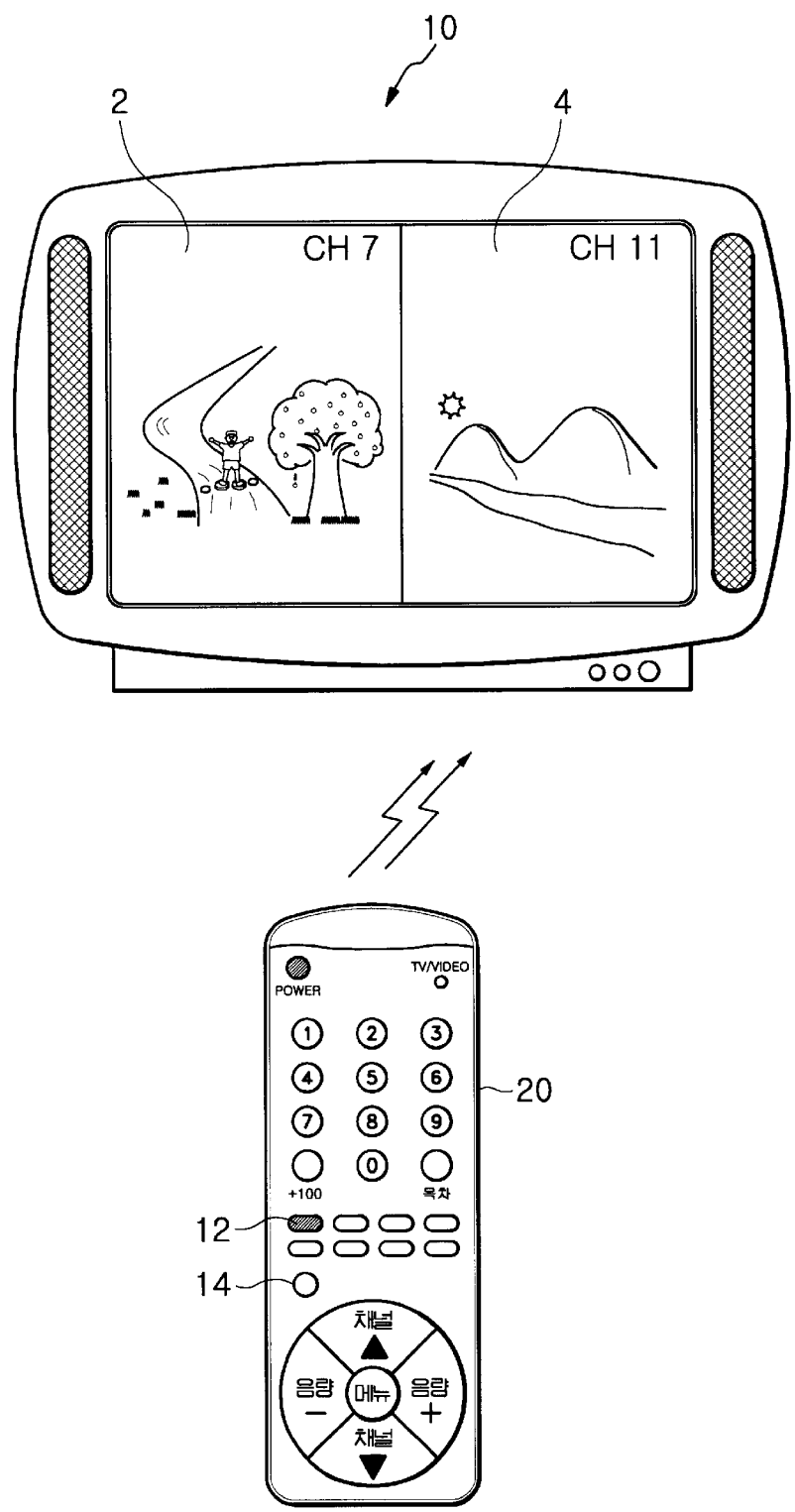
Figure 1C:
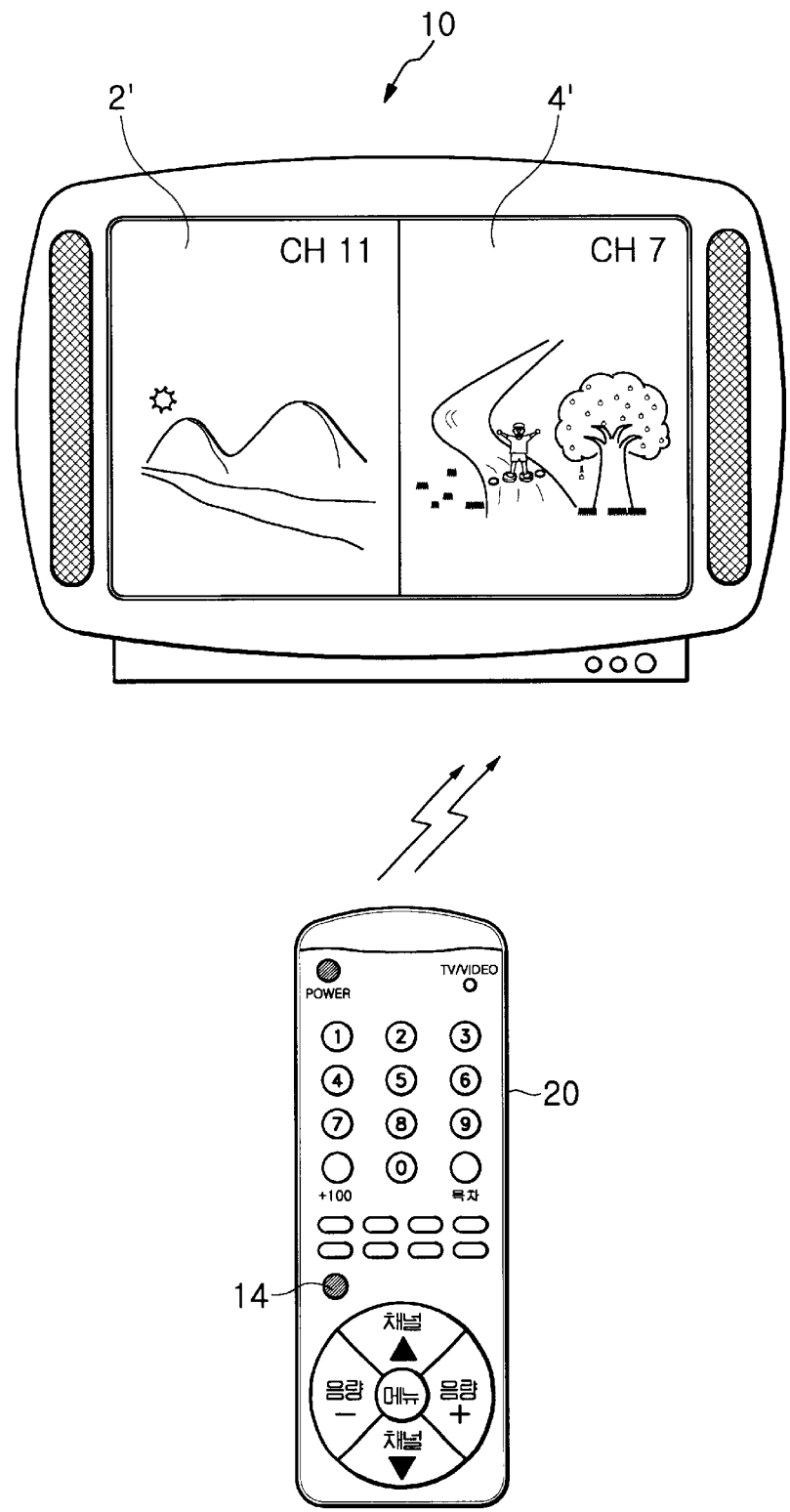
Figure 2:
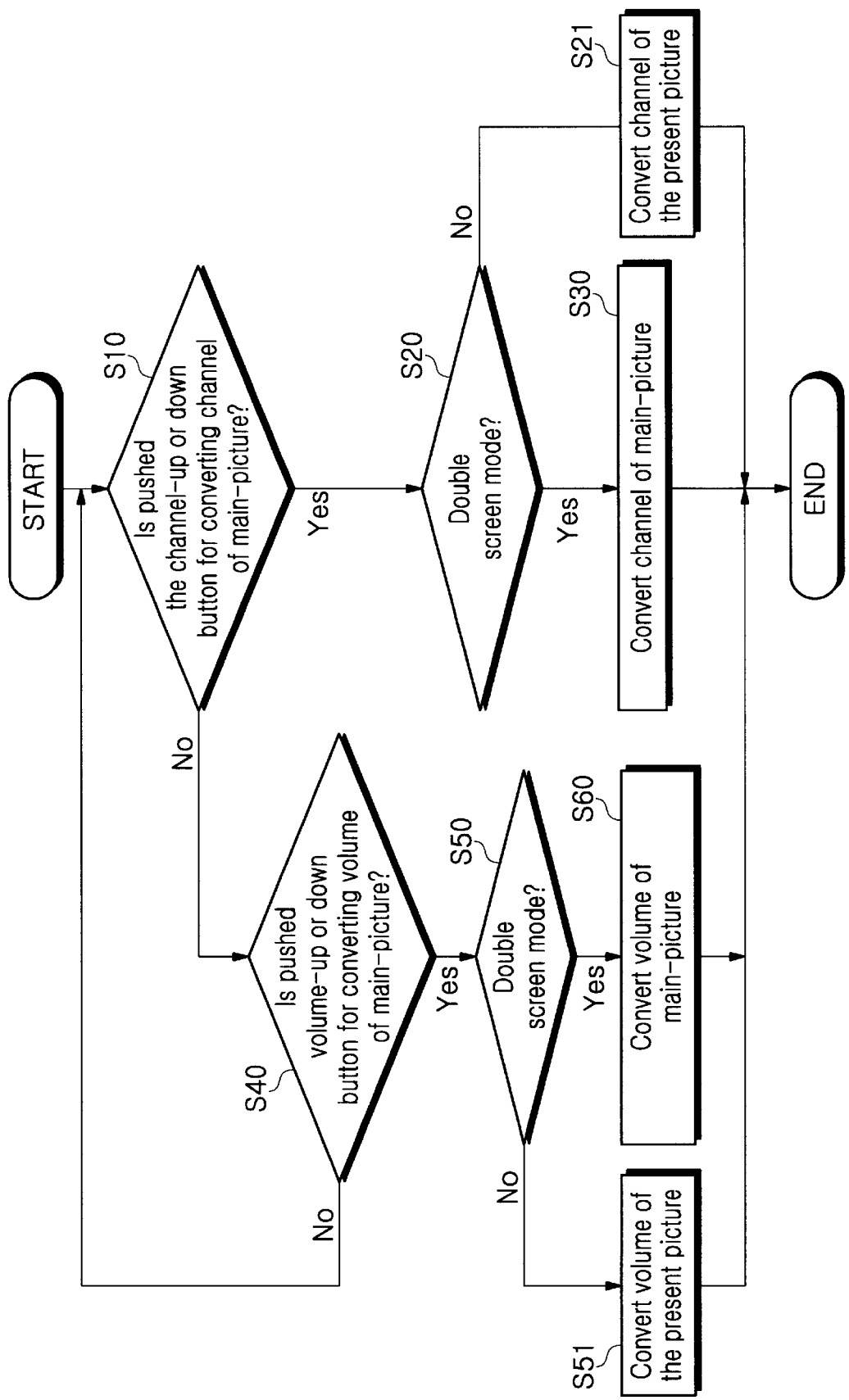
FIG. 2 is a flow chart showing a method for changing a channel or varying a volume of a main-picture of a television having a multiple screen mode function in accordance with the preferred embodiment of the present invention.

Referring to FIG. 2, there is described a method for changing a channel of main picture 2.

The microprocessor of the television receiver 10 determines whether or not main picture channel up 21 or channel down 22 button has been pushed (S10). After receipt of a channel up or down signal generated by pushing main picture channel up button 21 or main picture channel down button 22, the microprocessor determines whether an operation mode of the present screen is the normal mode or the multiple screen mode (S20). If the operation mode of the television is in the multiple screen mode, the microprocessor converts only the channel of main picture 2 without changing a channel of sub-picture 4 (S30). Otherwise, if the operation mode of the screen is in the normal mode, the microprocessor converts the present channel to a higher or a lower channel (S21).

Referring again to FIGS. 2 and 4, a method for varying a volume level of main picture 2 in television receiver 10 is similarly described.

Figure 4A:
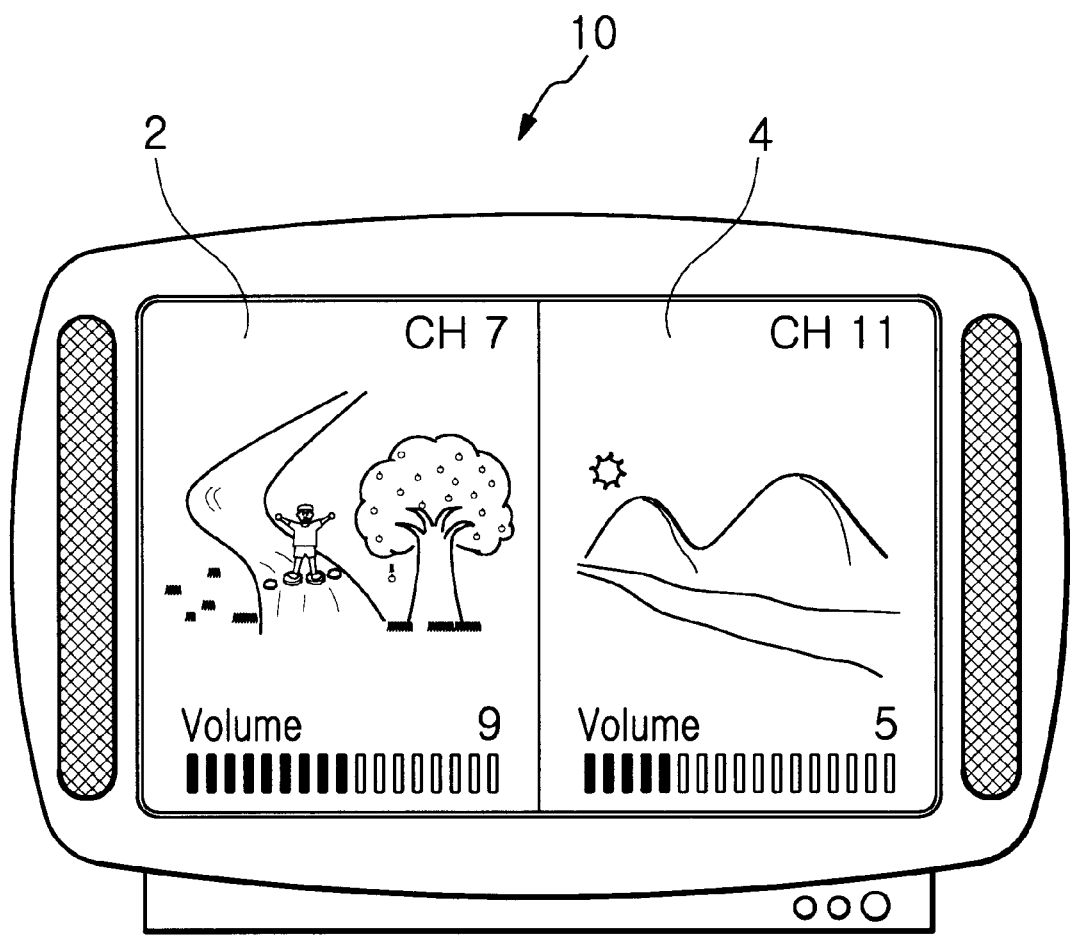
FIGS. 4A to 4C are schematic diagrams showing a method for controlling a volume level of a main-picture in the multiple screen mode of a television in accordance with the present invention.
Figure 4B:
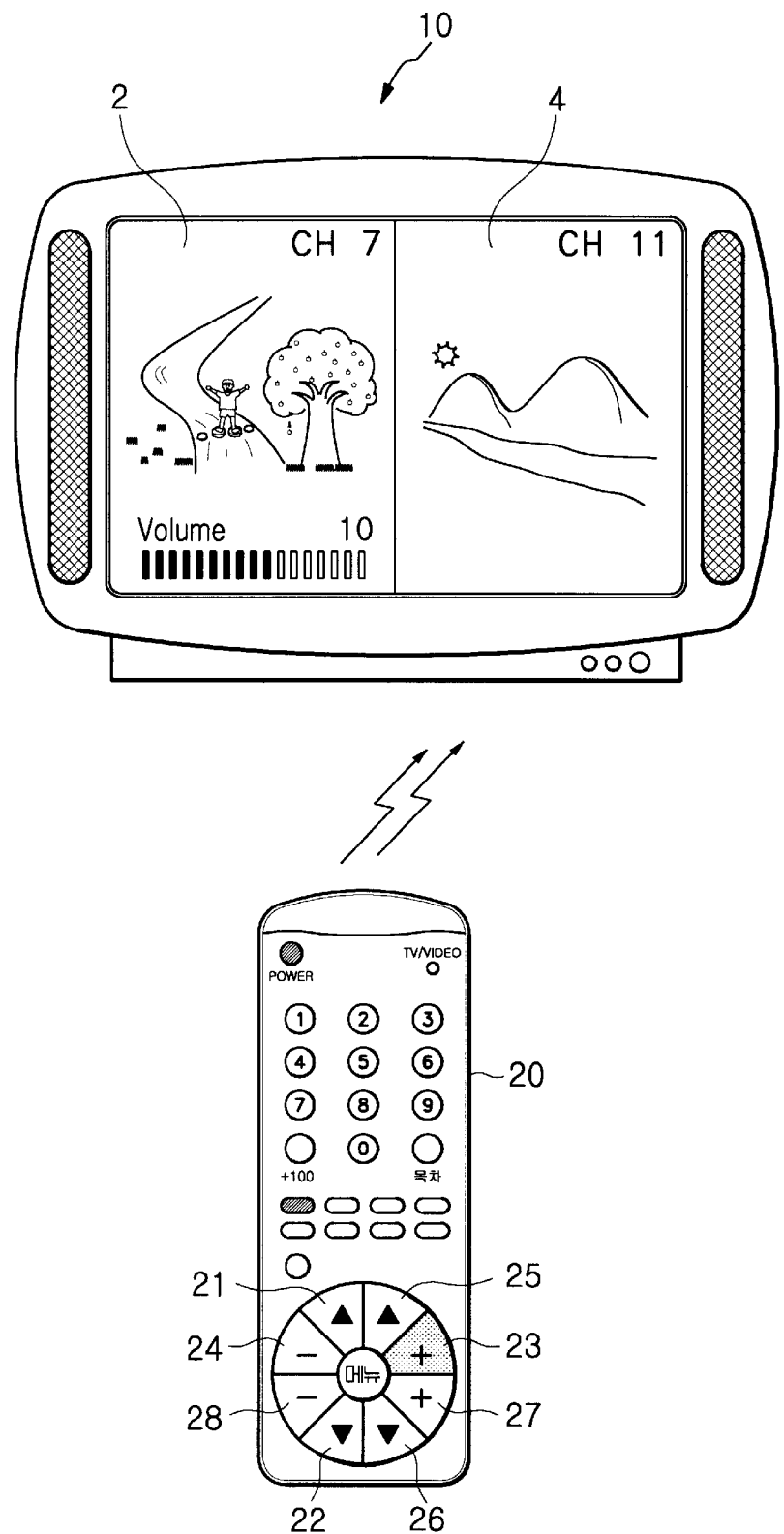
Figure 4C:
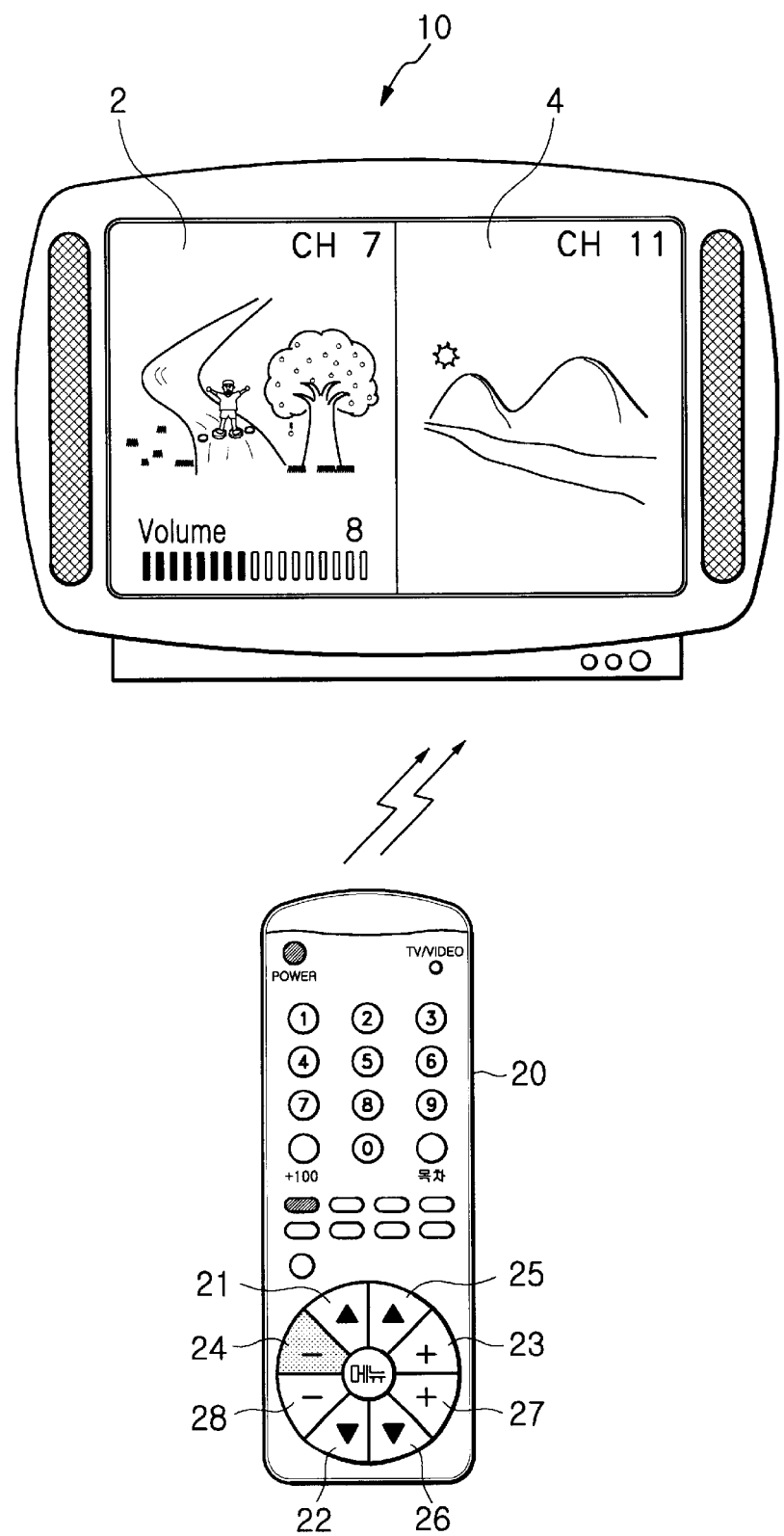

In FIG. 4A, there is shown television receiver 10, in multiple screen mode, wherein the viewer is varying a volume level, currently "9", of main picture 2. When the viewer pushes main picture volume up key 23 or main picture volume down key 24 of remote controller 20, the volume level of main picture 2 is varied into a volume level of "10" shown in FIG. 4B or to a volume level of "8", shown in FIG. 4C.

If main picture channel up key 21 or channel down key 22 is not pushed during determining step S10, the microprocessor of television receiver 10 determines whether or not main picture volume up key 23 or down key 24 has been pushed (S40). When it is determined that main picture volume up key 23 or volume down key 24 has been pushed, the microprocessor determines whether or not the operation mode of the present screen is multiple screen mode (S50). When the operation mode is multiple screen mode, the microprocessor varies a volume level of main picture 2 into a higher volume level or a lower volume level (S60). Otherwise, if the operation mode is the normal mode, the microprocessor varies a volume level of the present channel to a higher volume level or a lower volume level (S51).

Figure 5:
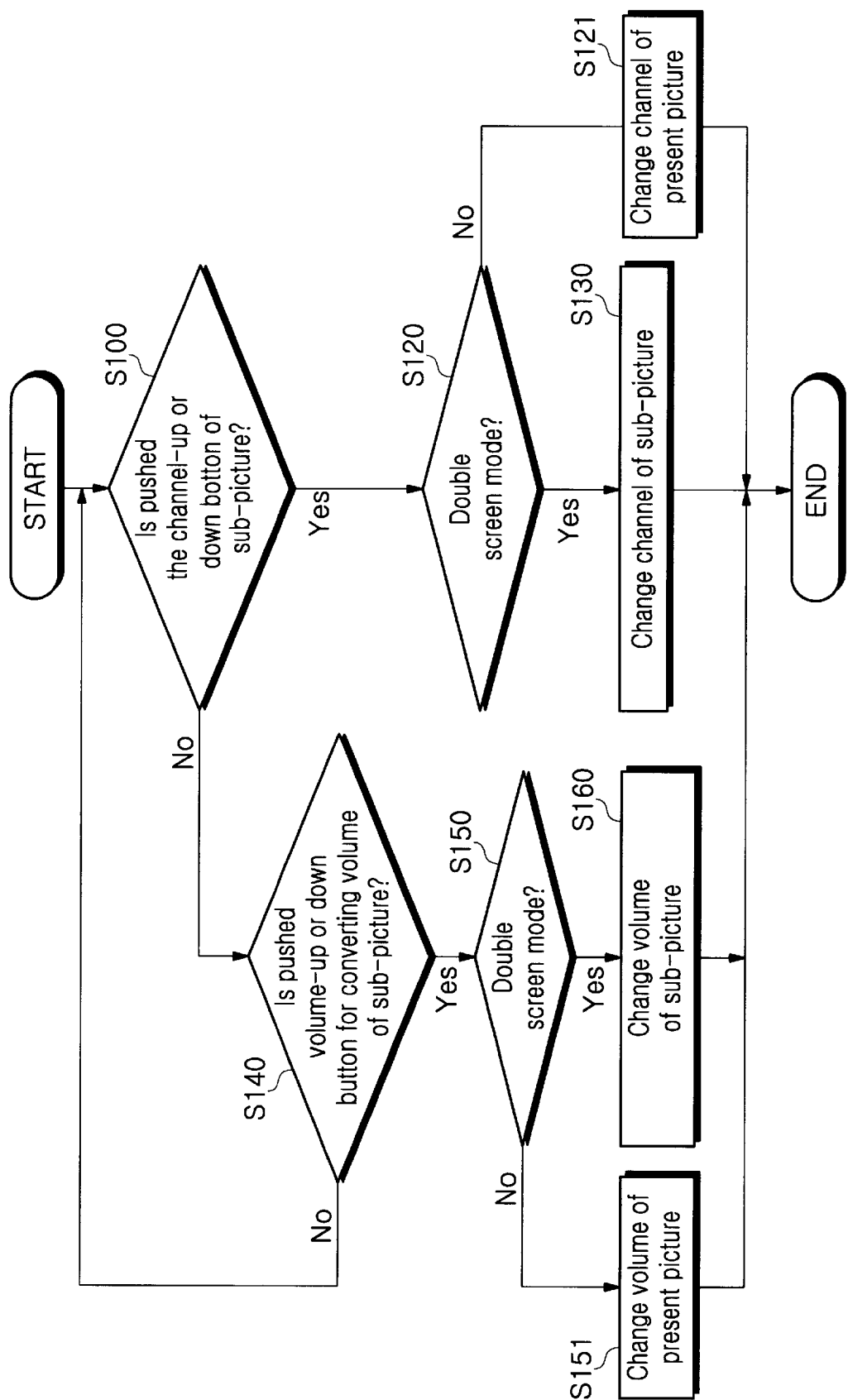
FIG. 5 is a flow chart showing a method for changing a channel or varying a volume of a sub-picture of a television having a multiple screen mode function in accordance with a preferred embodiment of the present invention.

Referring to FIGS. 5–7, there is described a method for changing a channel of sub-picture 4 and varying a volume of sub-picture 4.

Figure 6A:
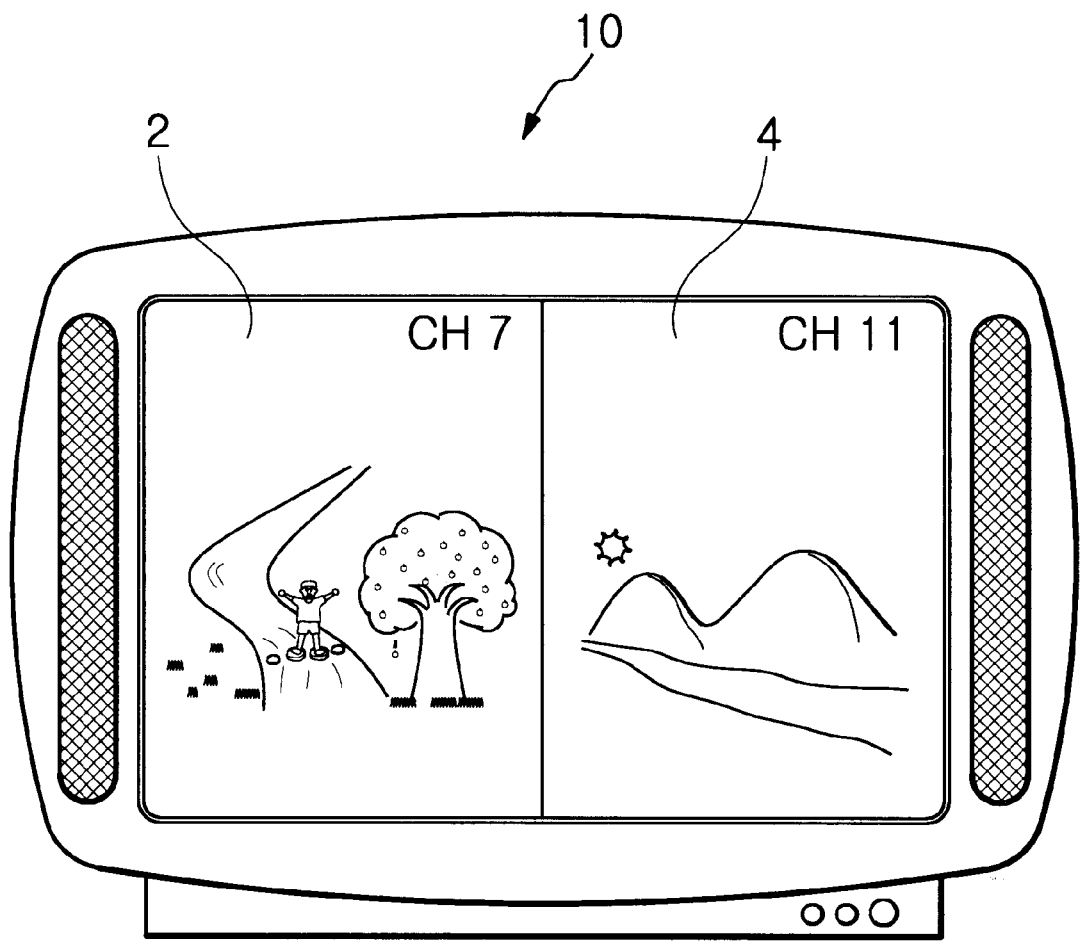
FIGS. 6A to 6C are schematic diagrams showing a method for changing a channel of a sub-picture in the multiple screen mode of a television.
Figure 6B:
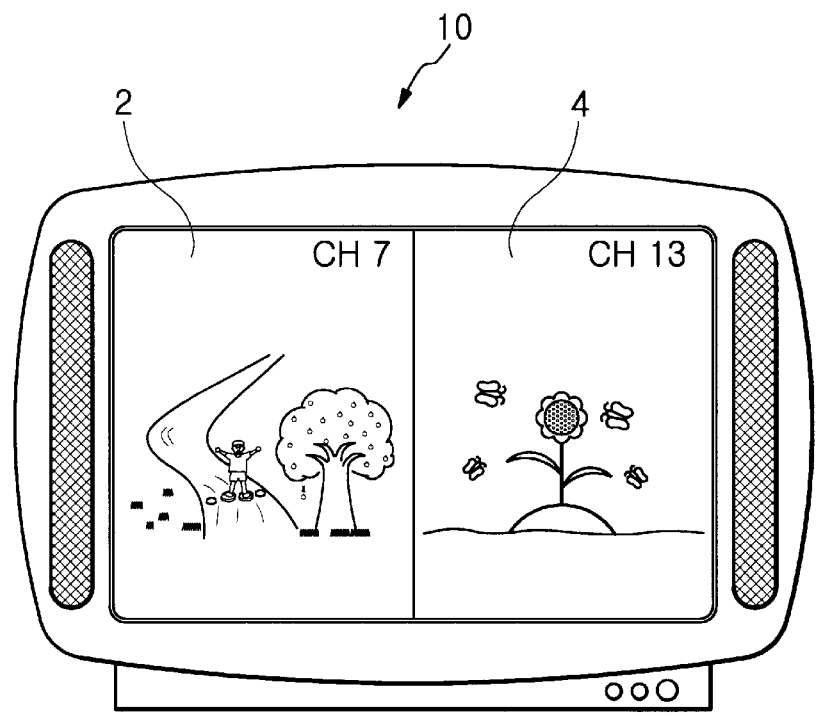
Figure 6B:
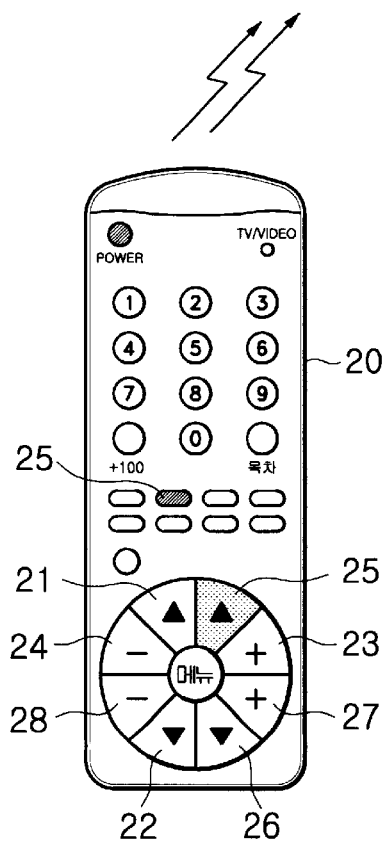
Figure 6C:
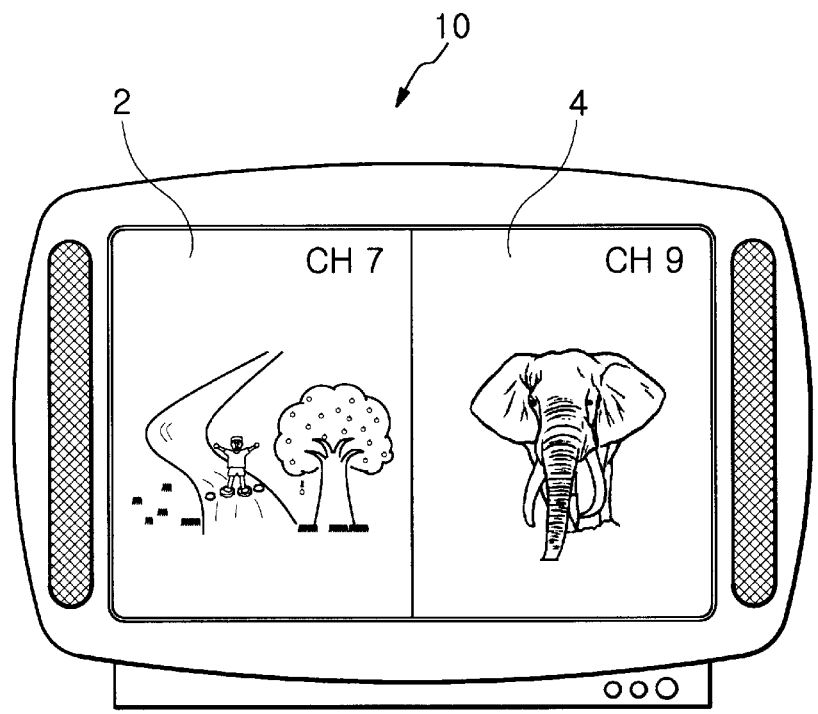
Figure 6C:
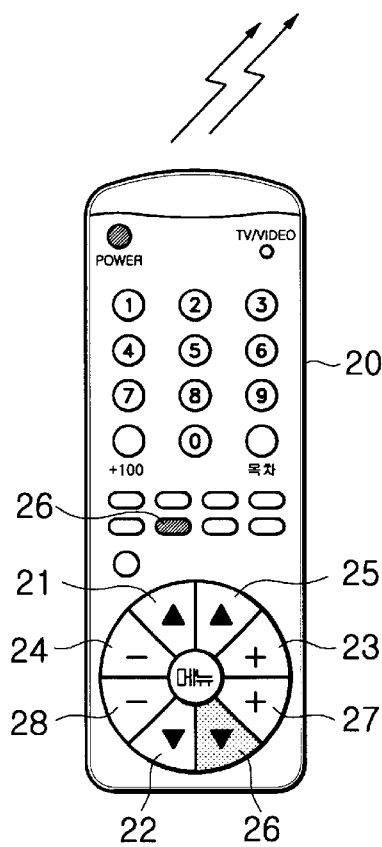

FIG. 6A shows television receiver 10 in multiple screen mode. Turning now to FIGS. 6A and 6B, the process of changing a channel of sub-picture 4 from channel "11" to channel "13" begins when the viewer pushes sub-picture channel up button (or key) 25 of remote controller 20. As sub-picture channel up key 25 is pushed, an infrared ray having a specific wavelength band is irradiated. Television 10 receives the infrared ray signal for changing the present sub-picture channel of channel "11" into a higher channel, for example, channel "13" through an infrared ray receiver (not shown) and the received channel up infrared signal is transmitted into the microprocessor of television receiver 10. The microprocessor converts the present channel of the sub-picture, channel "11" into channel "13". At this time, main-picture 2 maintains the present channel of channel "7" because a main-picture channel changing signal has not been received.

Referring to FIG. 5, there is described a method for changing a channel of sub-picture 4.

The microprocessor of television 10 determines whether or not sub-picture channel up 25 or channel down button 26 has been pushed (S100). After receipt of a channel up or down signal generated by pushing sub-picture channel up button 25 or sub-picture channel down button 26, the microprocessor determines whether the operation mode of the present screen is the normal mode or the multiple screen mode (S120). If the operation mode of the television is the multiple screen mode, the a microprocessor converts only the channel of sub-picture 4 without changing the channel of main picture 2(S130). Otherwise, if the operation mode of the screen is the normal mode, the microprocessor converts the present channel to a higher or a lower channel at S121.

Figure 7A:
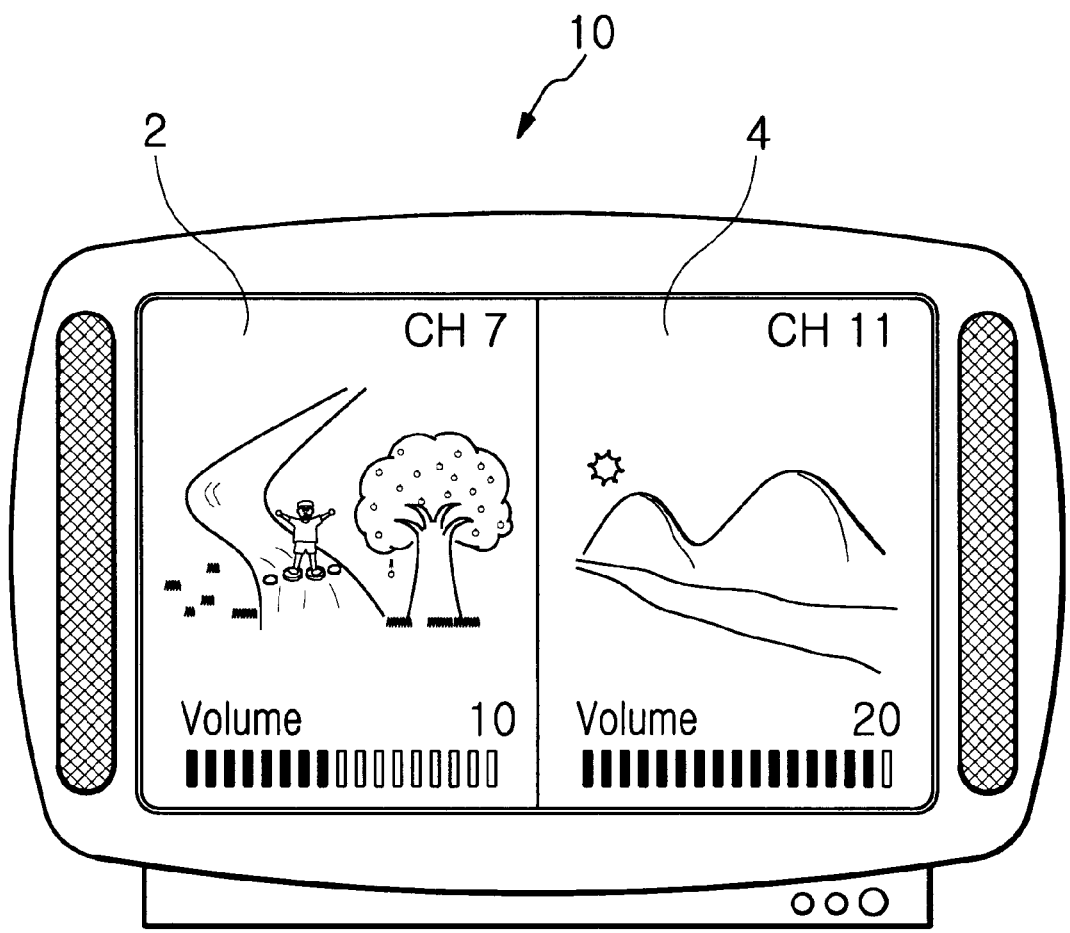
FIGS. 7A to 7C are schematic diagrams showing a method for varying a volume level of a sub-picture in a multiple screen mode of a television according to the present invention.
Figure 7B:
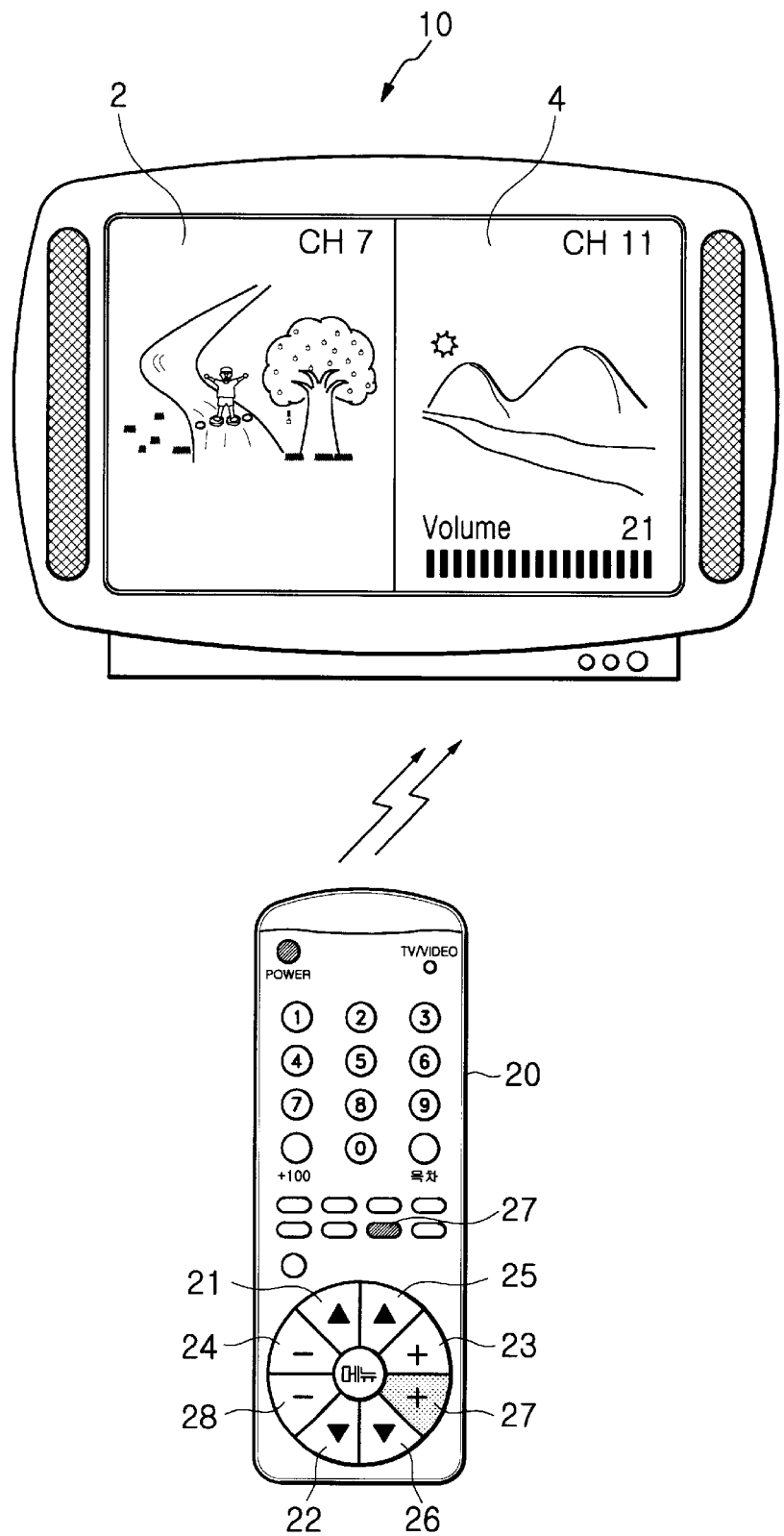
Figure 7C:
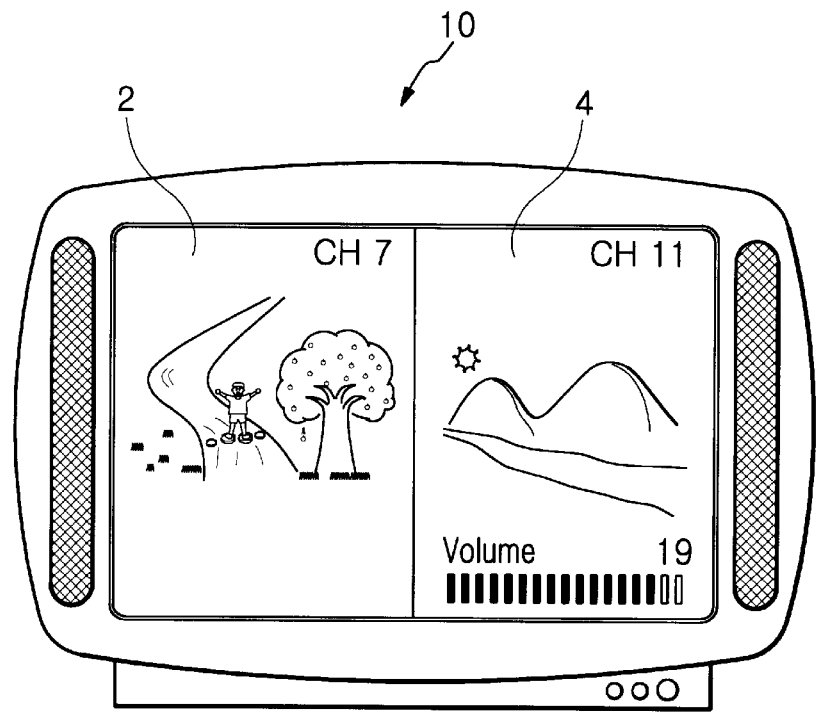
Figure 7C:
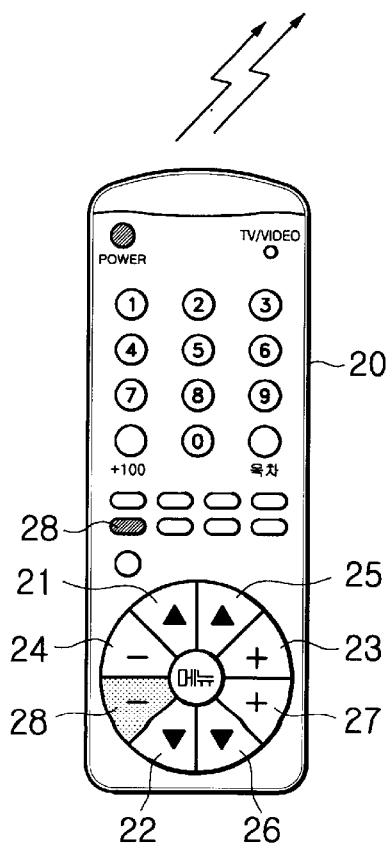

Referring again to FIGS. 5 and 7A, a method for varying a volume level of the sub-picture in the television receiver 10 is similarly described. In FIG. 7A, there is shown television receiver 10, in multiple screen mode, in which a volume indicative represents "20" volume level for sub-picture 4 and "10" volume level for main picture 2. When the viewer pushes sub-picture volume up key 27 or sub-picture volume down key 28 of remote controller 20, the volume level of main picture 2 is varied into a volume level of "21", shown in FIG. 7B or to a volume level.of "19" shown in FIG. 7C.

If sub-picture channel up key 27 or channel down key 28 is not pushed during determining step S100 of the channel conversion key input shown in FIG. 5, the microprocessor of television receiver 10 determines whether or not sub-picture volume up 27 or volume down key 28 has been pushed (S140). When it is determined that sub-picture volume up key 27 or volume down key 28 has been pushed, the microprocessor determines whether or not an operation mode of the present screen is the multiple screen mode (S150). When the operation mode is multiple screen mode, the microprocessor varies a volume level of sub-picture 4 into a higher volume level or a lower volume level (S160). Otherwise, when the operation mode is the normal mode, the microprocessor varies a volume level of the present channel to a higher volume level or a lower volume level (S151).

The viewer can continue to push the sub-picture volume up button 27 or the sub-picture volume down button 28 for the volume control of sub-picture 4, thereby causing the volume of the present sub-picture to be consecutively changed into a higher volume level or a lower volume level in a period of a predetermined time.

Meanwhile, although the flowcharts of FIG. 2 and FIG. 5 are separately described, they follow each other and form a loop continually waiting for a key press as an alternative embodiment of the invention.

The user may cycle the screen of television 10 from main picture 2 in normal mode, to main-sub picture, to sub-main picture, and finally to sub-picture 4 only inverted normal mode picture. This is performed by consecutively pressing multiple screen button 12 located on remote controller 20. In more detail, the normal screen mode is converted to the multiple screen mode by pushing the multiple screen button 12 once. Pressing multiple screen button 12 again, in the multiple screen mode, converts the multiple screen mode to an inversion multiple screen mode which displays the present main picture as a new sub picture and the present sub-picture as a new main picture. Thereafter, pushing multiple screen button 12 again, in the inversion screen mode, converts inversion multiple screen mode to an inversion normal mode in which the main picture disappears and only the sub picture is displayed.

Returning to FIG. 2 and FIG. 5, when the present operation mode is the normal mode from the screen mode determining steps S20 and S120, the pushing of the channel up or down buttons for channel conversion of main picture or sub-picture allows the channel of the present picture to be converted. Also, when the present operation mode is the normal mode from the screen mode determining steps S50 and S150, the pushing of the volume up or down buttons for the volume control of the main picture or the sub-picture allows only the volume of the present picture to be controlled.

As described previously, the present invention can convert a channel or a volume of sub-picture 4 in multiple screen mode without changing sub-picture 4 into new main picture 2. Moreover, since the present invention makes it possible to convert the screen operation mode from the multiple screen mode to the normal mode or vice verse only using multiple screen key 12 and not main to sub-picture changing key 14, it reduces the number of needed keys.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A television remote controller capable of changing a channel or a volume level of a television receiver, the television having a screen capable of displaying a normal mode which displays one picture on the screen of the television receiver and a multiple screen mode which displays more than one picture consisting of a main picture and at least one sub picture on the screen, the television receiver including channel and volume level changing functions of the main picture and the at least one sub picture, comprising:

a first channel changing key assembly for changing the channel of the main picture;

a second channel changing key assembly for changing the channel of the at least one sub-picture;

a first volume changing key assembly for changing the volume of the main picture; and a second volume changing key assembly for changing the volume of the at least one sub-picture.

2. The television remote controller of claim 1, further comprising a main-sub changing button for changing between main-sub and sub-main displays in said multiple screen mode.

3. The television remote controller of claim 1, wherein said first channel changing key assembly further comprises:

a main picture channel up key for changing a channel of the present main picture to a higher channel; and a main picture channel down key for changing a channel of the present main picture to a lower channel.

4. The television remote controller of claim 1, wherein said first volume level changing key assembly further comprises:

a main picture volume up key for changing a volume of the present main picture to a higher volume; and a main picture volume down key for changing a volume of the present main picture to a lower volume.

5. The television remote controller of claim 1, further comprising a multiple screen key for selecting either the normal mode or the multiple screen mode, the television receiver having an inversion screen mode function which displays more than one picture in which a present main-picture is converted to a new sub-picture and a present sub-picture is converted to a new main-picture on the screen, and an inversion normal mode function which displays only a new main-picture inverted from the present sub-picture on the screen, the normal mode, the multiple screen mode, the inversion multiple screen mode, and the inversion normal mode functions are sequentially converted with each press of said multiple screen key.

6. The television remote controller of claim 1, wherein said second channel changing key assembly further comprises:
   a sub picture channel up key for changing a channel of the present sub picture to a higher channel; and
   a sub picture channel down key for changing a channel of the present sub picture to a lower channel.

7. The television remote controller of claim 6, wherein said sub picture channel up key and said sub picture channel down key control only the channel selection of the main picture when in normal mode.

8. The television remote controller of claim 1, wherein said second volume level changing key assembly further comprises:
   a sub picture volume up key for changing a volume of the present sub picture to a higher volume; and
   a sub picture volume down key for changing a volume of the present sub picture to a lower volume.

9. The television remote controller of claim 8, wherein said sub picture volume up key and said sub picture volume down key control only the volume selection of the main picture when in normal mode.

10. A method for changing a channel or a volume level of a television receiver, the television receiver having a screen capable of displaying a normal mode which displays one picture on the screen of the television receiver and a multiple screen mode which displays dual pictures consisting of a main picture and a sub picture on the screen, the television receiver including channel and volume level changing functions of the main picture and the sub-picture, the method comprising the steps of:
   checking whether or not an input control signal for a channel, or a volume level conversion of the main picture or sub-picture is input from a remote controller having a first channel changing key assembly for changing the channel of the main picture, a second channel changing key assembly for changing the channel of the sub-picture, a first volume level changing key assembly for changing the volume of the main picture, and a second volume level changing key assembly for changing the volume of the sub-picture;
   determining whether or not said input control signal is a signal corresponding to either said first or second channel changing key assemblies or said first or second volume level changing key assemblies;
   determining whether or not the television receiver is in the multiple screen mode when said input control signal, corresponding to either said first or second channel changing key assemblies or said first or second volume level changing key assemblies, is received; and
   changing either a channel of the main picture or the sub picture and controlling the volume level of the main picture or the sub-picture corresponding to the inputs of said first or second channel changing key assemblies and said first or second volume level changing key assemblies, when the television receiver is in the multiple screen mode.

11. The method for changing a channel or a volume level of a television receiver according to claim 10, further comprising the steps of:
   checking whether or not a multiple screen key is pressed; and
   sequentially selecting between the normal mode, the multiple screen mode, an inversion multiple screen mode, and an inversion normal mode with each press of said multiple screen key.

12. A method for changing a channel or a volume level of a television receiver, the television receiver having a screen capable of displaying a normal mode which displays one picture on the screen of the television receiver and a multiple screen mode which displays dual pictures consisting of a main picture and a sub picture on the screen, the television receiver including channel and volume level changing functions of the main picture and the sub-picture, the method comprising the steps of:
   checking whether or not an input control signal for a channel, or a volume level conversion of the main picture or sub-picture is input from a remote controller having a first channel changing key assembly for changing the channel of the main picture, a second channel changing key assembly for changing the channel of the sub-picture, a first volume level changing key assembly for changing the volume of the main picture, and a second volume level changing key assembly for changing the volume of the sub-picture;
   determining whether or not said input control signal is a signal corresponding to either said first or second channel changing key assemblies or said first or second volume level changing key assemblies;
   determining whether or not the television receiver is in the multiple screen mode when said input control signal, corresponding to either said first or second channel changing key assemblies or said first or second volume level changing key assemblies, is received; and
   changing a channel of the main picture and controlling the volume level of the main picture corresponding to the inputs of said first or second channel changing key assemblies and said first or second volume level changing key assemblies, when the television receiver is in normal mode.

13. The method for changing a channel or a volume level of a television receiver according to claim 12, further comprising the steps of:
   checking whether or not a multiple screen key is pressed; and
   sequentially selecting between the.normal mode, the multiple screen mode, an inversion multiple screen mode, and an inversion normal mode with each press of said multiple screen key.

* * * * *